United States Patent
Garcia et al.

(10) Patent No.: US 11,821,502 B1
(45) Date of Patent: Nov. 21, 2023

(54) TORQUE CONVERTER HAVING MULTIPLE FLOW PASSAGES

(71) Applicant: Schaeffler Technologies AG & Co. KG, Herzogenaurach (DE)

(72) Inventors: Ricardo Humberto Garcia, Puebla (MX); Jose Manuel Alvarez, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/954,418

(22) Filed: Sep. 28, 2022

(51) Int. Cl.
*F16H 45/02* (2006.01)

(52) U.S. Cl.
CPC ....... *F16H 45/02* (2013.01); *F16H 2045/021* (2013.01); *F16H 2045/0215* (2013.01); *F16H 2045/0294* (2013.01)

(58) Field of Classification Search
CPC ... F16H 45/02; F16H 2045/0205–0215; F16H 2045/0273–0294
See application file for complete search history.

(56) References Cited

U.S. PATENT DOCUMENTS

| | | | |
|---|---|---|---|
| 9,188,212 B2 * | 11/2015 | Vanni | F16H 45/02 |
| 10,451,158 B2 | 10/2019 | Vanni et al. | |
| 10,941,844 B2 * | 3/2021 | Nelson | F16H 45/02 |
| 11,187,312 B2 | 11/2021 | Nelson et al. | |
| 11,402,004 B2 | 8/2022 | Norwich | |
| 11,402,005 B1 | 8/2022 | Nelson | |
| 11,421,768 B1 | 8/2022 | Flores et al. | |
| 2021/0254695 A1 | 8/2021 | Norwich et al. | |
| 2022/0136593 A1 * | 5/2022 | Ishikawa | F16D 25/0638 192/3.28 |

* cited by examiner

*Primary Examiner* — Timothy Hannon
*Assistant Examiner* — James J Taylor, II

(57) ABSTRACT

A torque converter includes a front cover, an impeller assembly, a turbine assembly, a lock-up clutch, a backing plate, and a flow plate. The front cover is arranged to receive a torque. The lock-up clutch includes a piston and a seal plate disposed axially between the piston and a turbine shell. The backing plate is non-rotatably connected to the seal plate and is sealed to the piston. The flow plate is disposed axially between the backing plate and the front cover. The flow plate is non-rotatably connected to the backing plate and the front cover. A through-bore extends axially through the backing plate and the flow plate. A first chamber is bounded at least in part by the piston, the seal plate, and the backing plate, and a second chamber is bounded at least in part by the front cover, the piston, the backing plate, and the flow plate.

20 Claims, 4 Drawing Sheets

TORQUE CONVERTER HAVING MULTIPLE FLOW PASSAGES

TECHNICAL FIELD

The present disclosure relates generally to torque converters and more specifically to torque converters having multiple flow passages to supply fluid to pressure chambers.

BACKGROUND

Many vehicles include a launch device between the engine and the transmission. A torque converter is a type of launch device commonly used in vehicles having an automatic transmission. A typical torque converter includes an impeller assembly fixed to the crankshaft of the engine and a turbine assembly fixed to a turbine shaft, which is the input to the transmission. To improve fuel economy, most torque converters include a bypass or lock-up clutch that mechanically couples the turbine shaft to a case of the torque converter to bypass the fluid coupling. Torque converters may have multiple flow passages for clutch apply and release. It is known to use cross-flow hubs for providing flow paths for clutch apply and release pressure chambers. However, these cross-flow hubs may be expensive and add complexity to a torque converter design. Accordingly, it is desirable to provide alternative methods for providing fluid flow paths to pressurized chambers of a torque converter.

SUMMARY

Embodiments of this disclosure provide a torque converter including a front cover, an impeller assembly, a turbine assembly, a lock-up clutch, a backing plate, and a flow plate. The front cover is arranged to receive a torque. The impeller assembly has an impeller shell non-rotatably connected to the front cover. The turbine assembly is in fluid communication with the impeller assembly and includes a turbine shell. The lock-up clutch includes a piston and a seal plate disposed axially between the piston and the turbine shell. The backing plate is non-rotatably connected to the seal plate and is sealed to the piston. The flow plate is disposed axially between the backing plate and the front cover. The flow plate is non-rotatably connected to the backing plate and the front cover. A through-bore extends axially through the backing plate and the flow plate. A first chamber is bounded at least in part by the piston, the seal plate, and the backing plate, and a second chamber is bounded at least in part by the front cover, the piston, the backing plate, and the flow plate.

In embodiments, at least one of the flow plate or the backing plate may be arranged to non-rotatably connect to a transmission input shaft. In embodiments, the seal plate may be non-rotatably connected to the backing plate at an inner diameter of the seal plate, and the seal plate may be sealed to the piston at an outer diameter of the seal plate. In embodiments, the front cover may include an axial portion and a radial portion extending radially inward from the axial portion. The flow plate may be non-rotatably connected to the front cover radially inside of the radial portion. In embodiments, the flow plate may be non-rotatably connected to the radial portion of the front cover. In embodiments, an outer diameter of the seal plate may be radially offset relative to an outer diameter of the flow plate.

In embodiments, the torque converter may include a first flow path configured to provide fluid to the first chamber. The first flow path may pass through the through-bore and may include a portion bounded in part by the front cover and the flow plate. A second flow path may be configured to provide fluid to the second chamber. The second flow path may include a portion bounded in part by the flow plate and the backing plate. The first flow path may be sealed from the second flow path. For a lock-up mode, the piston may be non-rotatably connected to the front cover and pressurized fluid is arranged to flow through the first flow path passing through the through-bore into the first chamber to displace the piston in an axial direction toward the front cover. For a torque converter mode, pressurized fluid is arranged to flow through the second flow path passing into the second chamber to displace the piston in an axial direction away from the front cover to disconnect the piston from the front cover.

In embodiments, the flow plate may be non-rotatably connected to the front cover at an outer diameter of the flow plate. In embodiments, the flow plate may be non-rotatably connected to the front cover radially outside of the through-bore. In embodiments, a rivet may connect the backing plate with the flow plate, and the through-bore may be defined within the rivet.

In embodiments, the lock-up clutch may include a clutch plate and friction facings disposed axially between the front cover and the piston. A third chamber may be bounded at least in part by the front cover and the turbine shell. The torque converter may include a flow path configured to provide circulation fluid to the friction facings. The turbine shell may include an opening extending axially therethrough. The flow path may pass through the opening into the third chamber and may include a portion bounded in part by the turbine shell and the seal plate. The piston may include an opening radially outside of the opening of the turbine shell. The flow path may pass through the opening of the piston and may be routed through the friction facings. The turbine shell may be axially spaced from the impeller shell. The flow path may pass between the turbine shell and the impeller shell to return circulation flow to a transmission input shaft. The flow path may be sealed from the first chamber and the second chamber.

In embodiments, the first chamber may be sealed from the second chamber.

Embodiments disclosed herein provide the advantageous benefit of reduced costs and complexity of multi-pass torque converters, for example, by removing a flow plate that is typically used to direct flow to appropriate apply and compensation chambers. Furthermore, embodiments disclosed herein offer design advantages by creating a cross-flow configuration without any forgings or costly cross drilling operations.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
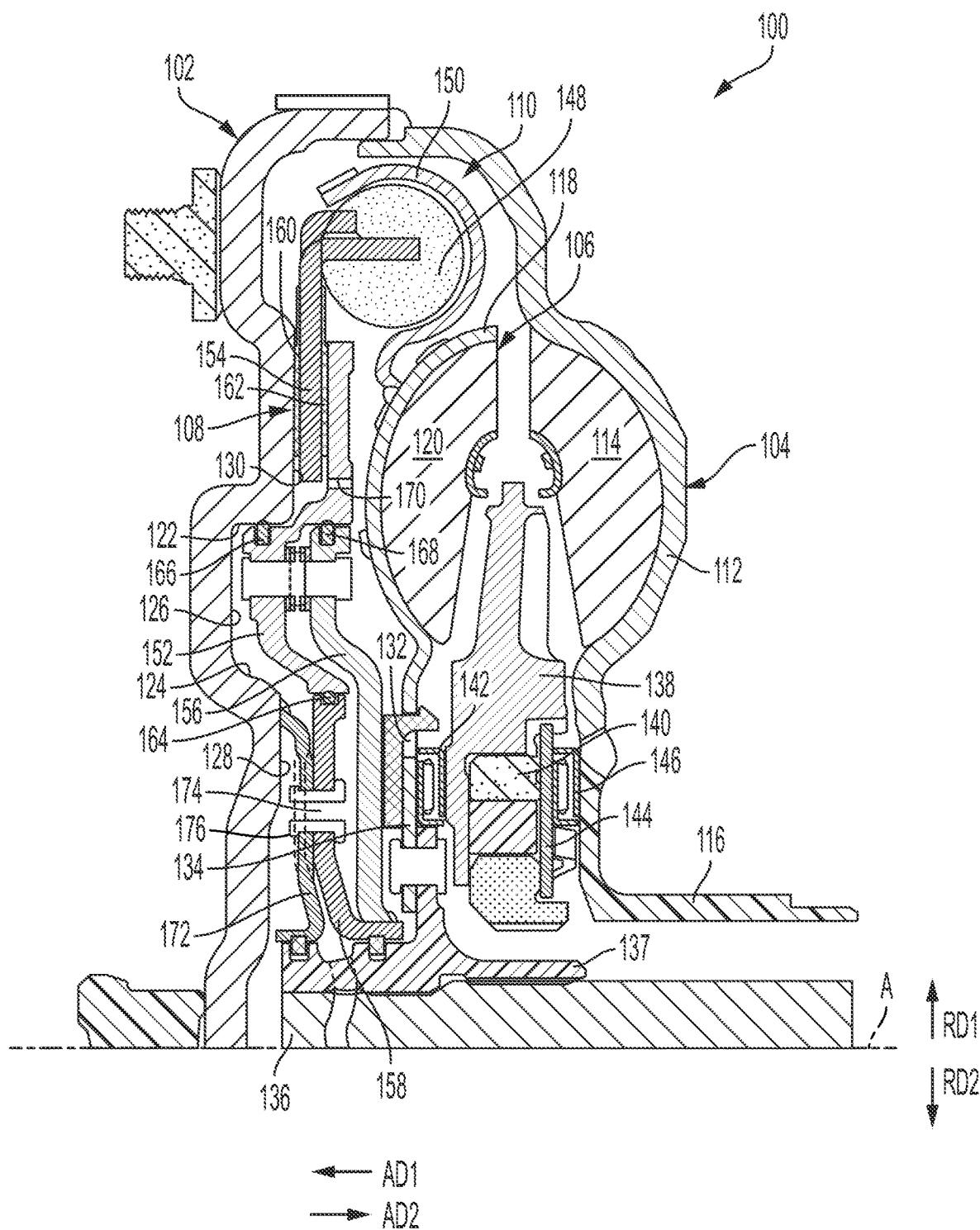
FIG. 1 illustrates a cross-sectional view of a torque converter configured for cross flow to pressure chambers according to an embodiment of the present disclosure.

Referring to FIGS. 1-4, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; a lock-up clutch 108; and a damper assembly 110. The impeller assembly 104 includes: an impeller shell 112 non-rotatably connected to the front cover 102 such that the impeller assembly 104 rotates as the front cover 102 rotates, at least one impeller blade 114 attached to an inner surface of the impeller shell 112, and an impeller hub 116 attached to a radially inner end of the impeller shell 112. The turbine assembly 106 includes a turbine shell 118 and at least one turbine blade 120 attached to the turbine shell 118. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The front cover 102 includes an axial portion 122 radially spaced from the central axis A and extending along the central axis A. The front cover 102 includes a transition portion 124 arranged radially inside of the axial portion 122. The transition portion 124 may extend oblique to the central axis A. The front cover 102 includes a radial portion 126 extending radially inward from the axial portion 122 to the transition portion 124. The radial portion 126 extends transverse to the axial portion 122 and the transition portion 124. The front cover 102 further includes an inner radial portion 128 extending radially inward from the transition portion 124, and an outer radial portion 130 extending radially outward from the axial portion 122.

The turbine shell 118 is axially spaced from the impeller shell 112. The turbine shell 118 includes an opening 132 extending axially through a radially extending inner portion 134 thereof. That is, the opening 132 is arranged radially inside of the turbine blade(s) 120. The radially extending inner portion 134 may be arranged to non-rotatably connect to a transmission input shaft 136. As one example, the radially extending inner portion 134 may be fixed to a hub 137, e.g., via a riveted connection, that is non-rotatably connected to the transmission input shaft 136, e.g., via a splined connection. As another example, the radially extending inner portion 134 may be sealed to the transmission input shaft 136 at an inner diameter thereof.

The torque converter 100 may include a stator 138 disposed axially between the impeller assembly 104 and the turbine assembly 106 to redirect fluid flowing from the turbine blade 120 before the fluid reaches the impeller assembly 104 to increase an efficiency of the torque converter 100. For example, the impeller blade 114, when rotated about the central axis A, pushes the fluid outwardly. The fluid pushes against the turbine assembly 106 of the torque converter 100, causing the turbine assembly 106 to revolve about the central axis A. The stator 138 functions to return the fluid from the turbine assembly 106 back to the impeller assembly 104 with minimal or no power loss. Drive power is transmitted from the turbine assembly 106 to a transmission input shaft 136. The torque converter 100 may, for example, further include: a one-way clutch 140 disposed within the stator 138, a thrust bearing 142 disposed axially between the stator 138 and the radially extending inner portion 134 of the turbine shell 118, a side plate 144 configured to retain the one-way clutch 140 within the stator 138, and a thrust bearing 146 provided axially between the impeller hub 116 and the side plate 144.

The damper assembly 110 is positioned axially between the front cover 102 and the impeller shell 112 and is configured for transferring torque from the front cover 102 to the transmission input shaft 136. The damper assembly 110 includes a spring 148 and a spring retainer 150. The spring 148 may be drivingly engaged with the lock-up clutch 108. The spring retainer 150 supports the spring 148 and is fixed to the turbine shell 118.

Power from the vehicle engine can be transmitted to a transmission (not shown) via fluid, and via the torque converter 100. In particular, the power may be transmitted to the front cover 102. The lock-up clutch 108 is configured to selectively transfer torque from the front cover 102 to the transmission input shaft 136. The lock-up clutch 108 includes a piston 152, a clutch plate 154, a seal plate 156, and a backing plate 158.

The clutch plate 154 is disposed between the front cover 102, e.g., the outer radial portion 130, and the piston 152. The clutch plate 154 may be configured to engage the spring 148. That is, the clutch plate 154 may transfer torque from the front cover 102 to the damper assembly 110. Friction material or facing 160 may be disposed between and affixed to one of the front cover 102 or the clutch plate 154; and friction material or facing 162 may be disposed and affixed to one of the clutch plate 154 or the piston 152. Friction material 160, 162 may include grooves or slots for cooling flow therethrough.

Figure 3:
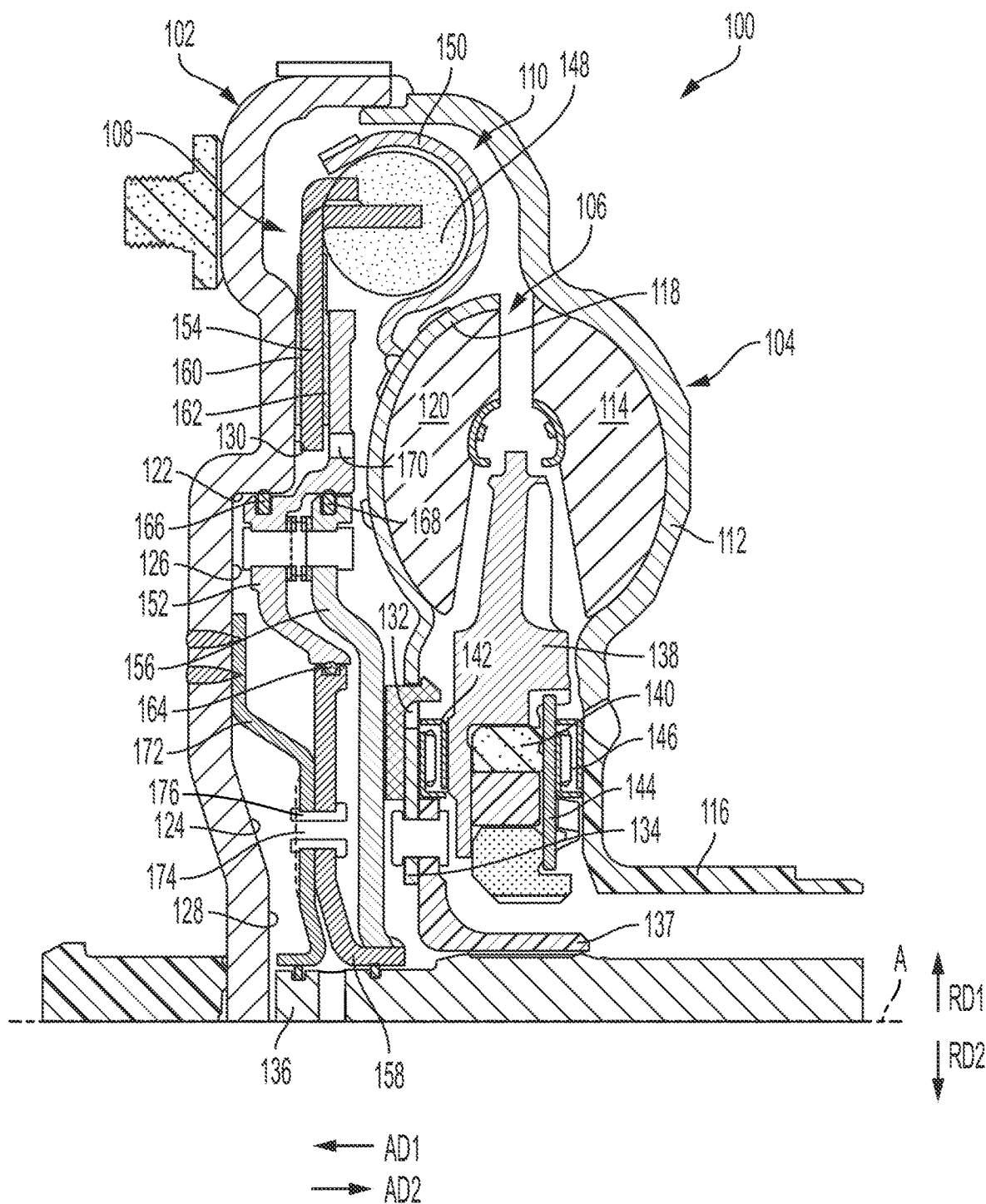
FIG. 3 illustrates a cross-sectional view of a torque converter configured for cross flow to pressure chambers according to another embodiment of the present disclosure.

The backing plate 158 is arranged to non-rotatably connect to the transmission input shaft 136. As one example, the backing plate 158 may be sealed, e.g., at the inner diameter thereof, to the hub 137 that is non-rotatably connected to the transmission input shaft 136, e.g., via a splined connection, as shown in FIG. 1. As another example, the backing plate 158 may be sealed to the transmission input shaft 136 at an inner diameter of the backing plate 158, as shown in FIG. 3. The backing plate 158 is sealed to the piston 152 via a seal 164. The backing plate 158 may be sealed at an outer diameter thereof to the piston 152.

The piston 152 may be sealed at an inner diameter thereof to the backing plate 158 via the seal 164. Additionally, the piston 152 is sealed to the axial portion 122 of the front cover 102 via a seal 166. The piston 152 may further be connected to the seal plate 156 via a leaf-spring connection that allows axial displacement of the piston 152 in first axial direction AD1 and second axial direction AD2 for selective engagement of lock-up clutch 108. The piston 152 may further include an opening 170 extending axially therethrough. The opening 170 may be arranged radially outside of the seal 166. The opening 170 may be arranged radially inside of the friction material 160, 162.

The seal plate 156 is sealed at an outer diameter thereof to the piston 152 via a seal 168. The seal plate 156 may be fixed at an inner diameter thereof to the backing plate 158, e.g., via staking. The seal plate 156 may be sealed to the backing plate 158, e.g., at the staking.

A flow plate 172 is disposed axially between the backing plate 158 and the front cover 102. The flow plate 172 is arranged to non-rotatably connect to the transmission input shaft 136. As one example, the flow plate 172 may be sealed, e.g., at the inner diameter thereof, to the hub 137 that is non-rotatably connected to the transmission input shaft 136, e.g., via a splined connection, as shown in FIG. 1. As another example, the flow plate 172 may be sealed at an inner diameter thereof to the transmission input shaft 136, as shown in FIG. 3.

The flow plate 172 is fixed at an outer diameter thereof to the front cover 102, e.g., via welding. The flow plate 172 may, for example, be fixed to the inner radial portion 128 of the front cover 102, as shown in FIG. 1. As another example, the flow plate 172 may be fixed to the radial portion 126 of the front cover 102, as shown in FIG. 3. The outer diameter of the flow plate 172 may be radially offset relative to the outer diameter of the backing plate 158. That is, one of the flow plate 172 or the backing plate 158 may extend radially outside of the other of the flow plate 172 or the backing plate 158.

The flow plate 172 includes a through-bore 174 bounded in opposite radial directions RD1 and RD2, orthogonal to the central axis A, by the flow plate 172. The through-bore 174 is further defined by the backing plate 158 and is also bounded in opposite radial directions RD1 and RD2 by the backing plate 158. In an example embodiment: the torque converter 100 includes a rivet 176 connecting the flow plate 172 and the backing plate 158, wherein through-bore 174 passes through, or is defined within, the rivet 176.

The torque converter 100 includes an apply chamber 178, a compensation chamber 180, and a circulation chamber 182. The apply chamber 178 is bounded, at least in part, by the seal plate 156, the backing plate 158, the seal 164, the piston 152, and the seal 168. The compensation chamber 180 is bounded, at least in part, by the front cover 102, the flow plate 172, the backing plate 158, the seal 164, the piston 152, and the seal 166. The seals 164, 166, 168 maintain a fluid separation between apply chamber 178 and the compensation chamber 180. The circulation chamber 182 is bounded, at least in part, by the seal plate 156 and the impeller shell 112. By "bounded in part," we mean that a portion of the cited chamber, flow path, or other structure is bounded, or formed, by the cited element.

Figure 2:
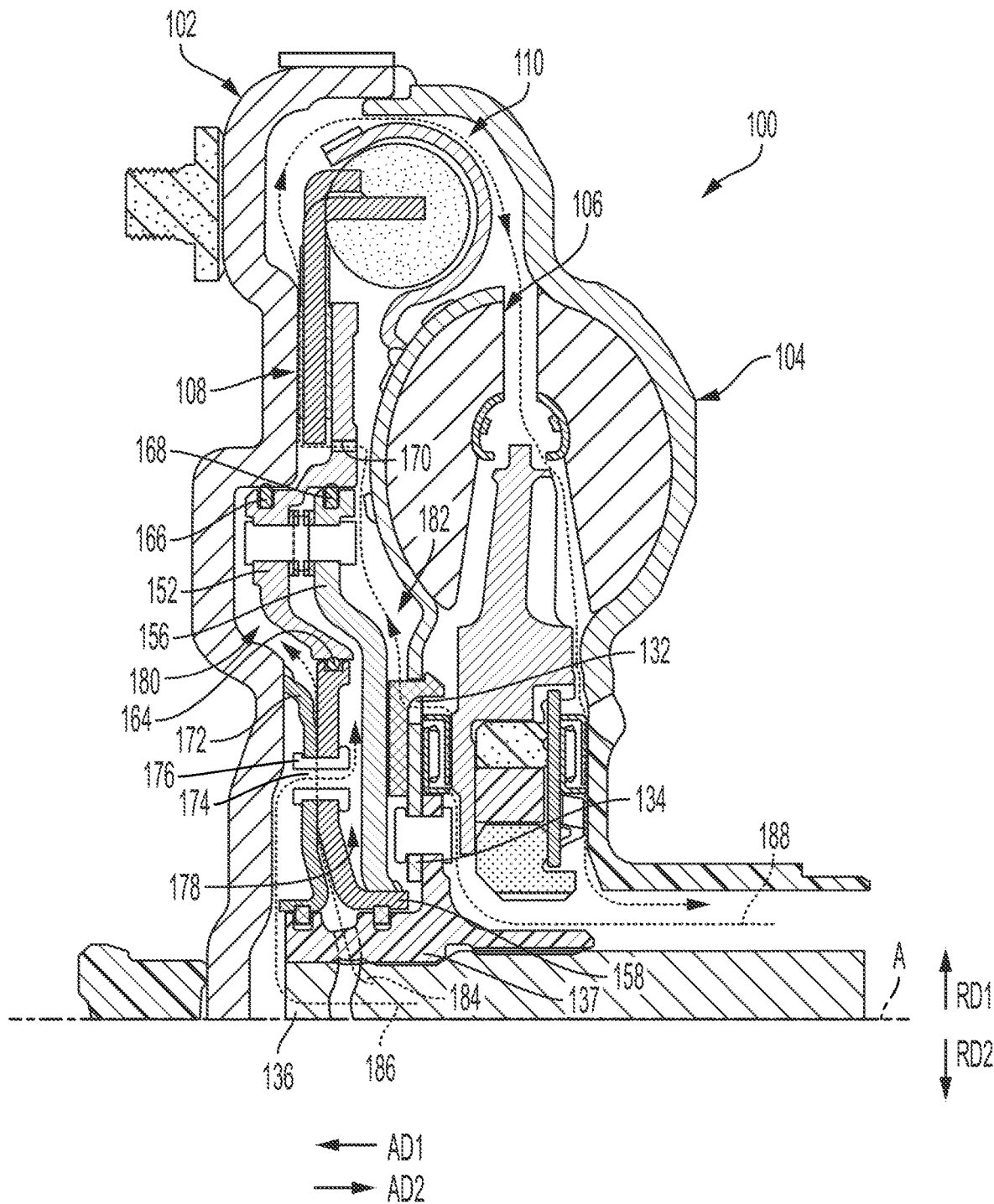
FIG. 2 illustrates the cross-sectional view of the torque converter shown in FIG. 1 showing cross flow to pressure chambers.
Figure 4:
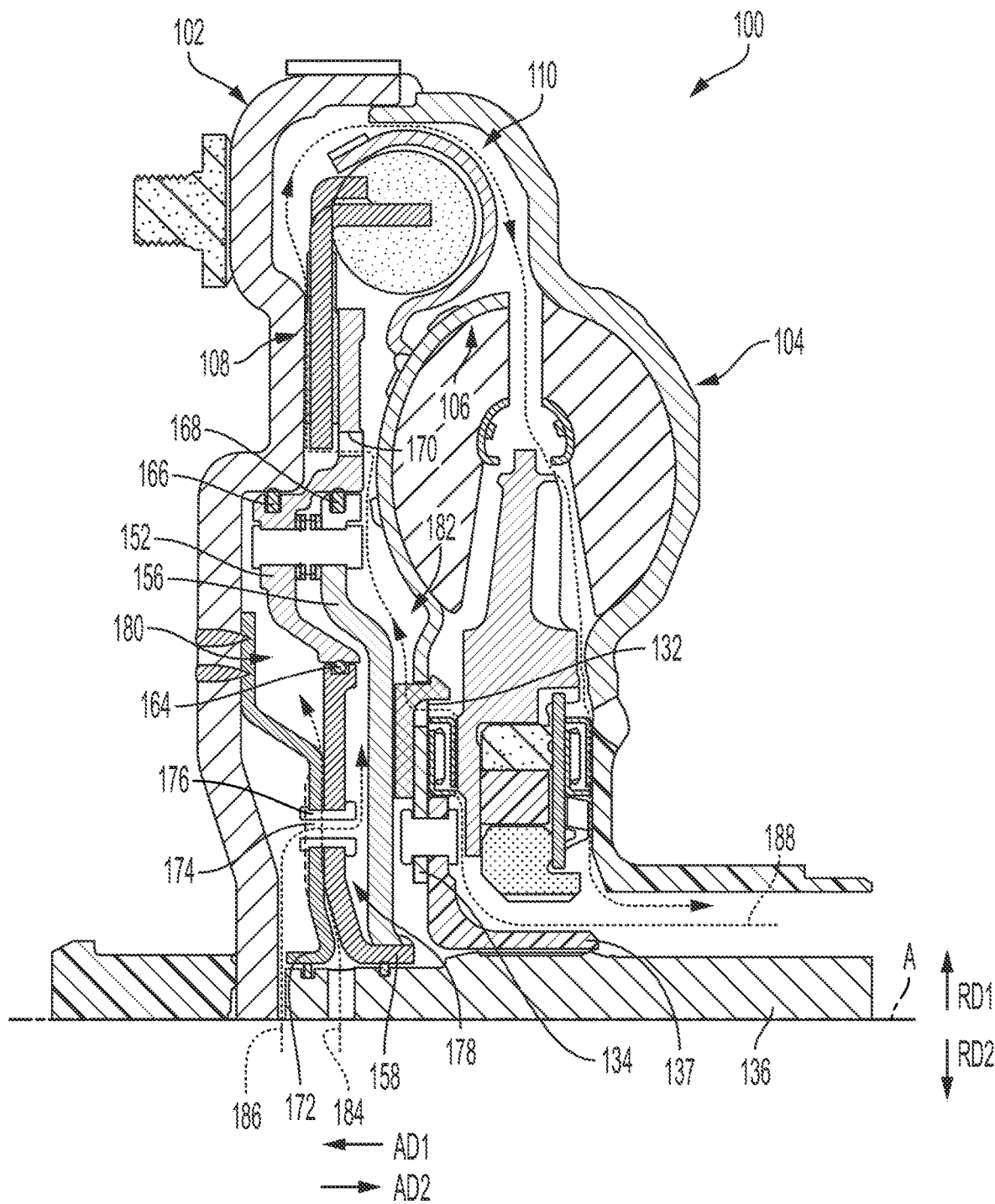
FIG. 4 illustrates the cross-sectional view of the torque converter shown in FIG. 3 showing cross flow to pressure chambers.

With reference to FIGS. 2 and 4, the torque converter 100 includes a flow path 184 and a flow path 186. The flow path 186 is sealed from the flow path 184 and includes, that is, passes through, the through-bore 174. That is, the flow path 186 includes the through-bore 174. The flow path 184 does not pass through the through-bore 174. The flow path 186 may further be bounded, at least in part, by the front cover 102 and the flow plate 172. The flow path 186 passes through the through-bore 174 and into the apply chamber 178. That is, pressurized fluid may be supplied from the transmission input shaft 136 to the flow path 186 extending into the apply chamber 178. The piston 152 engages or closes the lock-up clutch 108 in response to the pressurization of a medium (e.g., fluid such as oil) in the apply chamber 178, e.g., by axially displacing the piston 152 towards the front cover 102.

The flow path 184 is bounded, at least in part, by the flow plate 172 and the backing plate 158. That is, the flow path 184 passes or flows between the flow plate 172 and the backing plate 158. The flow plate 172 and/or the backing plate 158 may include grooves (not numbered) for flow therebetween. That is, fluid may be supplied from the transmission input shaft 136 to the flow path 184 extending between the flow plate 172 and the backing plate 158 into the compensation chamber 180.

For a lock-up mode for the torque converter 100, in which the piston 152 is non-rotatably connected to the front cover 102 and the torque is transmitted to the transmission input shaft 136 through the lock-up clutch 108, pressurized fluid is arranged to flow through the flow path 186, and passing through the through-bore 174, into the apply chamber 178 to displace the piston 152 in the axial direction AD1 to connect the piston 152 with the front cover 102 bypassing the hydrodynamic fluid coupling. For a torque converter mode for the torque converter 100, in which the front cover 102 is rotatable with respect to the piston 152 and the torque bypasses the lock-up clutch 108, pressurized fluid is arranged to flow through the flow path 184, including passing between the flow plate 172 and the backing plate 158, into the compensation chamber 180 to displace the piston 152 in the axial direction AD2, opposite direction AD1, to disconnect the piston 152 from the front cover 102.

With continued reference to FIGS. 2 and 4, the torque converter 100 may include a flow path 188. Pressurized fluid is provided to the circulation chamber 182 via the flow path 188. The flow path 188 travels from the transmission input shaft 136 between the stator 138 and the radially extending inner portion 134 of the turbine shell 118 and through the opening 132 in the turbine shell 118 into the circulation chamber 182. The flow path 188 is further bounded by the piston 152 and the front cover 102. That is, the fluid is arranged to flow through the opening 170 in the piston 152 and then be routed through the friction facings 160, 162, e.g., to cool the friction facings 160, 162. The fluid is returned to the transmission input shaft 136 by passing between the turbine shell 118 and the impeller shell 112, and then being routed between the impeller shell 112 and the side plate 144. The flow path 188 is sealed from the apply chamber 178 and the compensation chamber 180.

Embodiments according to the present disclosure provide various advantages including cost reductions by creating a cross flow configuration without any forgings or costly cross drilling operations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
108 lock-up clutch
110 damper assembly
112 impeller shell
114 impeller blade
116 impeller hub
118 turbine shell
120 turbine blade
122 axial portion
124 transition portion
126 radial portion
128 inner radial portion
130 outer radial portion
132 opening
134 radially extending inner portion
136 transmission input shaft
137 hub
138 stator
140 one-way clutch
142 thrust bearing
144 side plate
146 thrust bearing
148 spring
150 spring retainer
152 piston
154 clutch plate
156 seal plate
158 backing plate
160 friction facing
162 friction facing
164 seal
166 seal
168 seal
170 opening
172 flow plate
174 through-bore
176 rivet
178 apply chamber
180 compensation chamber
182 circulation chamber
184 flow path
186 flow path
188 flow path
A central axis
AD1 axial direction
AD2 axial direction
RD1 radial direction
RD2 radial direction

What is claimed is:

1. A torque converter, comprising:
a front cover arranged to receive a torque;
an impeller assembly having an impeller shell non-rotatably connected to the front cover;
a turbine assembly in fluid communication with the impeller assembly and including a turbine shell;
a lock-up clutch including a piston and a seal plate disposed axially between the piston and the turbine shell;
a backing plate non-rotatably connected to the seal plate and sealed to the piston;
a flow plate disposed axially between the backing plate and the front cover, the flow plate being non-rotatably connected to the backing plate and the front cover; and
a through-bore extending axially through the backing plate and the flow plate, wherein a first chamber is bounded at least in part by the piston, the seal plate, and the backing plate, and a second chamber is bounded at least in part by the front cover, the piston, the backing plate, and the flow plate.

2. The torque converter of claim 1, wherein at least one of the flow plate and the backing plate is arranged to non-rotatably connect to a transmission input shaft.

3. The torque converter of claim 1, wherein the seal plate is non-rotatably connected to the backing plate at an inner diameter of the seal plate, and the seal plate is sealed to the piston at an outer diameter of the seal plate.

4. The torque converter of claim 1, wherein the front cover includes an axial portion and a radial portion extending radially inward from the axial portion, the flow plate being non-rotatably connected to the front cover radially inside of the radial portion.

5. The torque converter of claim 1, wherein the front cover includes an axial portion and a radial portion extending radially inward from the axial portion, the flow plate being non-rotatably connected to the radial portion of the front cover.

6. The torque converter of claim 1, wherein an outer diameter of the seal plate is radially offset relative to an outer diameter of the flow plate.

7. The torque converter of claim 1, further comprising:
a first flow path configured to provide fluid to the first chamber, wherein the first flow path passes through the through-bore and includes a portion bounded in part by the front cover and the flow plate; and
a second flow path configured to provide fluid to the second chamber, wherein the second flow path includes a portion bounded in part by the flow plate and the backing plate.

8. The torque converter of claim 7, wherein the first flow path is sealed from the second flow path.

9. The torque converter of claim 7, wherein, for a lock-up mode, the piston is non-rotatably connected to the front cover and pressurized fluid is arranged to flow through the first flow path passing through the through-bore into the first chamber to displace the piston in an axial direction toward the front cover.

10. The torque converter of claim 7, wherein, for a torque converter mode, pressurized fluid is arranged to flow through the second flow path passing into the second chamber to displace the piston in an axial direction away from the front cover to disconnect the piston from the front cover.

11. The torque converter of claim 1, wherein the flow plate is non-rotatably connected to the front cover at an outer diameter of the flow plate.

12. The torque converter of claim 1, wherein the flow plate is non-rotatably connected to the front cover radially outside of the through-bore.

13. The torque converter of claim 1, wherein a rivet connects the backing plate with the flow plate, and the through-bore is defined within the rivet.

14. The torque converter of claim 1, wherein the lock-up clutch includes:
a clutch plate; and
friction facings disposed axially between the front cover and the piston, wherein a third chamber is bounded at least in part by the front cover and the turbine shell.

15. The torque converter of claim 14, further comprising a flow path configured to provide circulation fluid to the friction facings.

16. The torque converter of claim 15, wherein the turbine shell includes an opening extending axially therethrough, the flow path passes through the opening into the third chamber and includes a portion bounded in part by the turbine shell and the seal plate.

17. The torque converter of claim 16, wherein the piston includes an opening radially outside of the opening of the turbine shell, the flow path passes through the opening of the piston and is routed through the friction facings.

18. The torque converter of claim 15, wherein the turbine shell is axially spaced from the impeller shell, the flow path passes between the turbine shell and the impeller shell to return circulation flow to a transmission input shaft.

19. The torque converter of claim 15, wherein the flow path is sealed from the first chamber and the second chamber.

20. The torque converter of claim 1, wherein the first chamber is sealed from the second chamber.

* * * * *